US006101110A

United States Patent [19]

Arts et al.

[11] Patent Number: 6,101,110

[45] Date of Patent: Aug. 8, 2000

[54] CIRCUIT ARRANGEMENT

[75] Inventors: Paulus P. B. Arts, Oss; Everaard M. J. Aendekerk, Eindhoven, both of Netherlands

[73] Assignee: U.S. Philips Corporation, New York, N.Y.

[21] Appl. No.: 09/342,823

[22] Filed: Jun. 29, 1999

[30] Foreign Application Priority Data

Jul. 1, 1998 [EP] European Pat. Off. .............. 98202217

[51] Int. Cl.[7] ............................. H02M 5/42; H05B 37/02

[52] U.S. Cl. .......................................... 363/89; 315/209 R

[58] Field of Search ................................. 363/76, 84, 89, 363/125, 127; 315/209 R, 209 CD, 224, 225, DIG. 5, DIG. 7

[56] References Cited

U.S. PATENT DOCUMENTS

| | | | |
|---|---|---|---|
| 5,349,270 | 9/1994 | Roll et al. | 315/209 R |
| 5,382,882 | 1/1995 | Nerone | 315/307 |
| 5,406,177 | 4/1995 | Nerone | 315/307 |
| 5,619,106 | 4/1997 | Secen | 315/290 |
| 5,986,408 | 11/1999 | Langeslag et al. | 315/94 |

*Primary Examiner*—Matthew Nguyen
*Attorney, Agent, or Firm*—Robert J. Kraus

[57] ABSTRACT

In a circuit arrangement for operating a lamp comprising a power feedback and an antiboost switch disabling the power feedback for part of the time, the control of the antiboost switch is realized by means of a very simple and, hence, inexpensive control circuit.

7 Claims, 3 Drawing Sheets

CIRCUIT ARRANGEMENT

BACKGROUND OF THE INVENTION

The invention relates to a circuit arrangement for supplying a lamp, comprising input terminals for connection to the terminals of an AC voltage source, rectifying means coupled to the input terminals and having output terminals for rectifying an AC voltage supplied by the AC voltage source, a first branch interconnecting the output terminals of the rectifying means and comprising a series arrangement of a first unidirectional element and first capacitive means, a second branch shunting the first capacitive means and comprising a series arrangement of a first and a second switching element, a first control circuit for rendering the first and the second switching element conducting and non-conducting, a load circuit having terminals for accommodating a lamp and a first end of which is coupled to a common point N1 of the first and the second switching element, and a second end of which is coupled to one of the output terminals of the rectifying means, a third branch connecting a point N6 of the load circuit to a point N7 between one of the output terminals of the rectifying means and the first unidirectional element, a fourth branch shunting the first unidirectional element and comprising a third switching element, a second control circuit for rendering the third switching element conducting and non-conducting.

A circuit arrangement of this type is known from the non-prepublished European patent application no. 97202122.4. In the known circuit arrangement, the first unidirectional means and the third branch jointly form part of power feedback means. With the aid of these power feedback means, a part of the power consumed by the load circuit during operation of the lamp is fed back to the output of the rectifying means. It is thereby achieved in a relatively inexpensive manner that the power factor of the circuit arrangement at the nominal luminous flux of a lamp fed by means of the circuit arrangement is relatively high.

However, if the luminous flux of the lamp is reduced by reducing the power consumed by the lamp, the ratio between the power consumed by the load circuit and the feedback power would be modified if the third switching element and the second control circuit did not form part of the circuit arrangement.

Consequently, the voltage across the first capacitive means could increase to such an extent that this might cause, for example, damage to the first and the second switching element. However, in the known circuit arrangement, the ratio between the power consumed by the load circuit and the feedback power is adjusted by adjusting the duty cycle of the third switching element. When the third switching element is conducting, the power feedback means are switched off. By means of a control loop coupled to the first capacitive means and forming part of the second control circuit, the duty cycle of the third switching element is adjusted in such a way that the voltage across the first capacitive means is substantially independent of the luminous flux of the lamp. Damage of the circuit arrangement caused during dipping of the lamp is prevented in this way. A drawback of the known circuit arrangement is, however, that the second control circuit is relatively complex and thus also expensive.

SUMMARY OF THE INVENTION

It is an object of the invention to provide a relatively simple and hence inexpensive circuit arrangement for operating a lamp having a relatively high power factor with which the lamp can be dipped through a large range.

To this end, a circuit arrangement according to the invention, as described in the opening paragraph, is characterized in that the second control circuit comprises a differentiator, an input of which is coupled to the point N1 and an output is coupled to a control electrode of the third switching element via a comparator, and the comparator is also coupled to a first circuit section for generating a reference voltage Vref.

During operation of the lamp, the input of the differentiator conveys a square-wave signal having an amplitude which is equal to the voltage across the first capacitive means and a frequency which is equal to that of the lamp current. Consequently, during operation of the lamp, the output of the differentiator conveys a signal having an amplitude which is dependent on the voltage across the first capacitive means and a frequency which is also equal to the frequency of the lamp current. The output of the comparator renders the third switching element conducting when the signal at the output of the differentiator is higher than the reference voltage Vref. It has been found that a lamp fed by means of the circuit arrangement can be dipped through a large range without the voltage across the first capacitive means reaching such a high value that it causes damage to the circuit arrangement.

It has proved to be an advantage if the first branch comprises a second unidirectional element and the point N7 is constituted by a common point of the first and the second unidirectional element. Such a second unidirectional element may be chosen to be such that less stringent requirements need to be imposed on the rectifying means. It has also proved to be an advantage to provide the circuit arrangement with a fifth branch comprising a series arrangement of a third and a fourth unidirectional element shunting the series arrangement of the first unidirectional element and the second unidirectional element, in which a common point N2 of the third and the fourth unidirectional element is connected to the second end of the load circuit, and in which the fourth unidirectional element is shunted by second capacitive means. Together with the second capacitive means, the third unidirectional element and the fourth unidirectional element jointly constitute further power feedback means which realize a further improvement of the power factor of the circuit arrangement.

The fourth branch preferably comprises a fifth unidirectional element. More particularly, if the third switching element is implemented as a MOSFET, a diode junction forming part of the switching element may become conducting at an unwanted instant in the case of a rapid variation of the voltage across the third switching element. This is prevented by the fifth unidirectional element.

In a very simple embodiment of the circuit arrangement according to the invention, the differentiator comprises a series arrangement of third capacitive means and two ohmic resistors.

Due to the fact that the power supply voltage is an AC voltage, the voltage across the first capacitive means is modulated at a frequency which is twice as high as the frequency of the AC voltage. This modulation is suppressed by the second control circuit, which may lead to instabilities in the operation of the circuit arrangement. To limit such instabilities to a considerable extent, the reference voltage is preferably rendered directly proportional to the voltage across the first capacitive means. When such a reference voltage is used, it has proved to be advantageous to provide the circuit arrangement with a second circuit section for generating a voltage Vrefmax which is equal to the highest value of the reference voltage Vref in each half cycle of the AC voltage, and for adding Vrefmax to the voltage at the output of the differentiator.

These and other aspects of the invention are apparent from and will be elucidated with reference to the embodiments described hereinafter.

DESCRIPTION OF THE PREFERRED EMBODIMENTS

Figure 1:
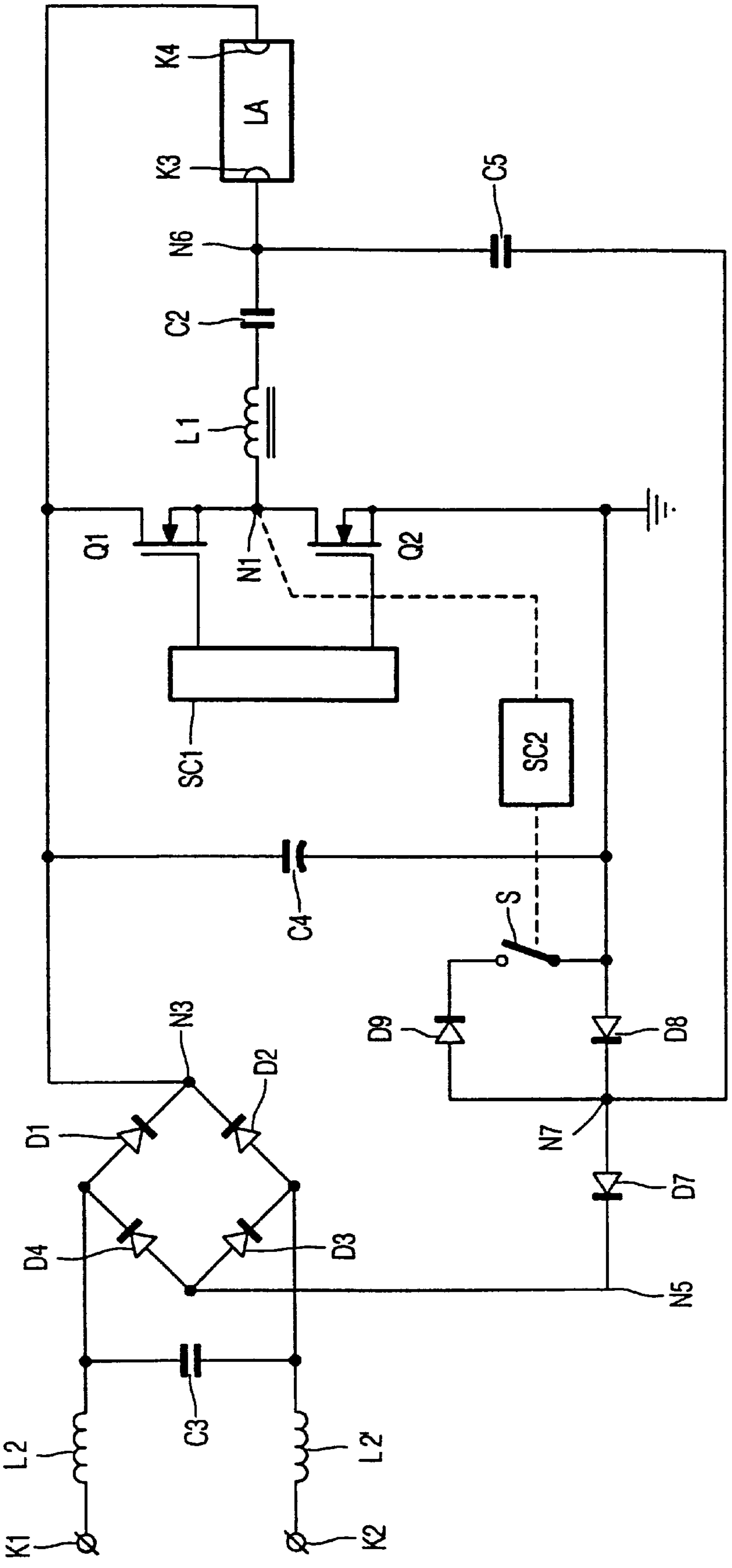
FIG. 1 shows diagrammatically a first embodiment of a circuit arrangement according to the invention, and a lamp connected thereto.

In FIG. 1, the references K1 and K2 denote terminals for connection to the terminals of an AC voltage source. Terminal K1 is connected to terminal K2 by means of a series arrangement of inductor L2, capacitor C3 and inductor L2'. This series arrangement operates as an input filter for limiting high-frequency interference of an AC voltage supplied by the AC voltage source. Respective sides of capacitor C3 are connected to respective input terminals of a diode bridge constituted by the diodes D1–D4. In this embodiment, this diode bridge constitutes rectifying means for rectifying the AC voltage supplied by the AC voltage source. A first output terminal N3 of the diode bridge is connected to a second output terminal N5 by means of a first branch constituted by a series arrangement of diode D7, diode D8 and capacitor C4. In this embodiment, diodes D8 and D7 constitute a first and a second unidirectional element, respectively. Capacitor C4 constitutes a first capacitive means. Diode D8 is shunted by a series arrangement of diode D9 and switching element S which constitutes a fourth branch in this embodiment. Diode D9 constitutes a fifth unidirectional element and switching element S constitutes a third switching element. Capacitor C4 is shunted by a second branch which is constituted by a series arrangement of a first switching element Q1 and a second switching element Q2. Respective control electrodes of the first and the second switching element are connected to respective outputs of a first control circuit SC1 for rendering the first and the second switching element conducting and non-conducting. Switching element S is coupled to an output of a second control circuit SC2. An input of the second control circuit SC2 is coupled to a common point N1 of the first and the second switching element. Both these couplings of the second control circuit are denoted by broken lines in FIG. 1. The first switching element Q1 is shunted by a series arrangement of coil L1, capacitor C2, terminal K3, lamp LA and terminal K4. In this embodiment, this series arrangement constitutes a load circuit. K3 and K4 are terminals for accommodating a lamp. A common point N6 of capacitor C2 and terminal K3 is coupled via capacitor C5, which constitutes a third branch in this embodiment, to a common point N7 of the unidirectional elements D7 and D8.

The embodiment shown in FIG. 1 operates as follows. If the input terminals K1 and K2 are connected to the terminals of an AC voltage source, the AC voltage supplied by the AC voltage source is rectified by the diode bridge to a DC voltage which is present across capacitor C4. Switching elements Q1 and Q2 are rendered alternately conducting and non-conducting at a frequency f by the first control circuit SC1, so that a square-wave voltage of the frequency f is present at the point N1 and an AC current of the frequency f flows through the load circuit. The third switching element S at frequency f is also rendered conducting and non-conducting by the second control circuit SC2. A part of the power consumed by the load circuit is fed back to the point N7 via capacitor C5.

This feedback is switched off when the switching element S is conducting. The circuit arrangement is dimensioned in such a way that the power factor is relatively high if the lamp has its nominal power consumption. The lamp can be dipped by raising, for example the frequency f. At higher values of the frequency f, the lamp has a lower power consumption so that it also has a lower luminous flux.

At these higher values of the frequency, there is, however, a different ratio between the power consumed by the load circuit and the part of this power fed back to point N7 via capacitor C5. If the control of this switching element S remains equal, this changed ratio may give rise to such a strong increase of the voltage across capacitor C4 that this might considerably shorten the lifetime of, for example, the switching elements Q1 and Q2 and of capacitor C4. However, the second control circuit SC2 changes the control of the switching element S upon a modification of the power consumption of the lamp, such that the voltage across capacitor C4 does not change or changes only to a limited extent.

Figure 2:
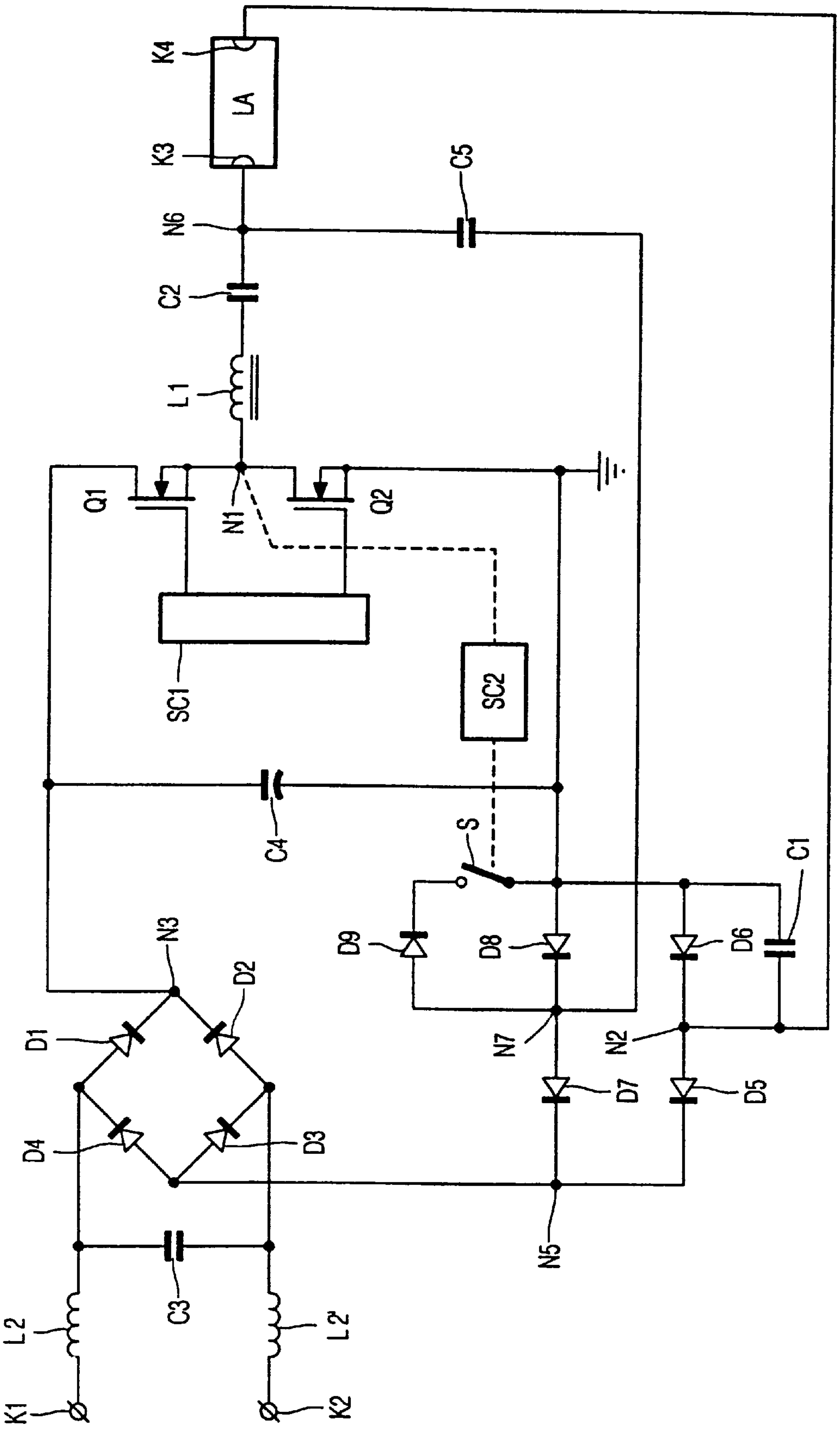
FIG. 2 shows diagrammatically a second embodiment of a circuit arrangement according to the invention, and a lamp connected thereto.

In FIG. 2, components and sections of the circuit which correspond to components and sections of the circuit of the embodiment shown in FIG. 1 are denoted by the same symbols. The greater part of the structure of the embodiment shown in FIG. 2 is similar to the embodiment shown in FIG. 1. However, the embodiment shown in FIG. 2 comprises a second power feedback which is constituted by diodes D5 and D6 and capacitor C1. A fifth branch constituted by a series circuit of diodes D5 and D6 shunts the series circuit of the first and the second-unidirectional element. Diodes D5 and D6 constitute a third and a fourth unidirectional element. A common point N2 of diodes D5 and D6 is connected to terminal K4 which constitutes one end of the load circuit. Diode D6 is shunted by capacitor C1 which constitutes second capacitive means in this embodiment. During operation of the embodiment shown in FIG. 2, there is not only power feedback to point N7 via capacitor C5 but also to point N2 via the entire load circuit. A further improvement of the power factor is obtained thereby. The second power feedback, however, does not cause any increase or only a very small increase of the voltage across capacitor C4 during dipping of the lamp. For this reason, it is not necessary to limit the second power feedback during dipping of the lamp in the same way as the first power feedback is limited by the third switching element S and the second control circuit SC2. The operation of the embodiment shown in FIG. 2 corresponds to that of the embodiment shown in FIG. 1 and will therefore not be described in further detail.

Figure 3:
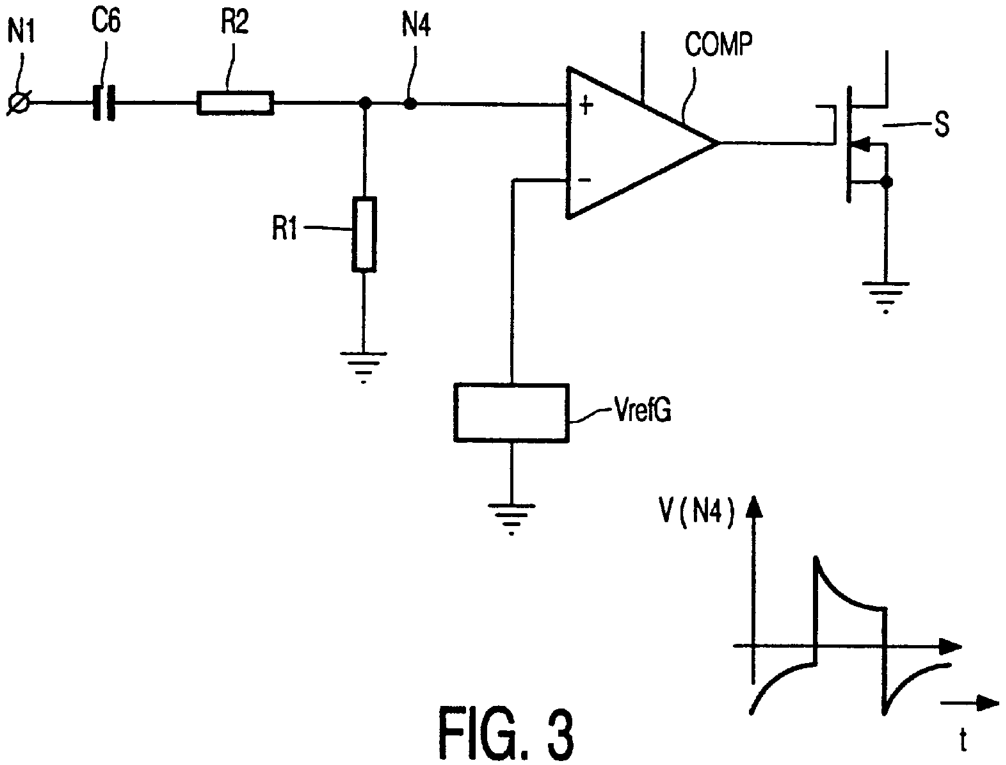
FIGS. 3 and 4 show parts of the embodiments of FIGS. 1 and 2 in greater detail.

FIG. 3 shows a first embodiment of the second control circuit and the third switching element S. A series circuit of capacitor C6 and ohmic resistors R1 and R2 constitutes a differentiator, an input of which is connected to the point N1.

Capacitor C6 constitutes third capacitive means. An output of the differentiator constituted by a common point N4 of ohmic resistors R1 and R2 is connected to a first input of comparator COMP. An output of comparator COMP is connected to a control electrode of the third switching element S. A second input of comparator COMP is connected to an output of a first circuit section VrefG for generating a reference voltage Vref. During operation of the second control circuit shown in FIG. 3, the input of the differentiator conveys a square-wave voltage at the frequency f. The amplitude of this square-wave voltage is equal to the voltage across capacitor C4. An AC voltage of frequency f and having a shape as shown in FIG. 3 is present at the output terminal N4 of the differentiator. The peak-to-peak amplitude of the steep edges of the voltage present at point N4 is dependent on the voltage across capacitor C4. The variation of the voltage at output N4 between two successive steep edges is determined by the RC time of the differentiator. The first circuit section VrefG generates a constant reference voltage Vref during operation. The third switching element is rendered conducting by the output of the comparator COMP at the frequency f during the time interval in which the voltage at output N4 is higher than the reference voltage Vref. If the voltage across capacitor C4 increases due to dipping of the lamp, the peak-to-peak amplitude of the steep edges of the signal present at output N4 consequently also increases. As a result, the time interval during which the voltage at output N4 is higher than the reference voltage Vref will also be longer. Consequently, the third switching element is rendered conducting for a longer time so that an increase of the voltage across capacitor C4 is obviated.

Figure 4:
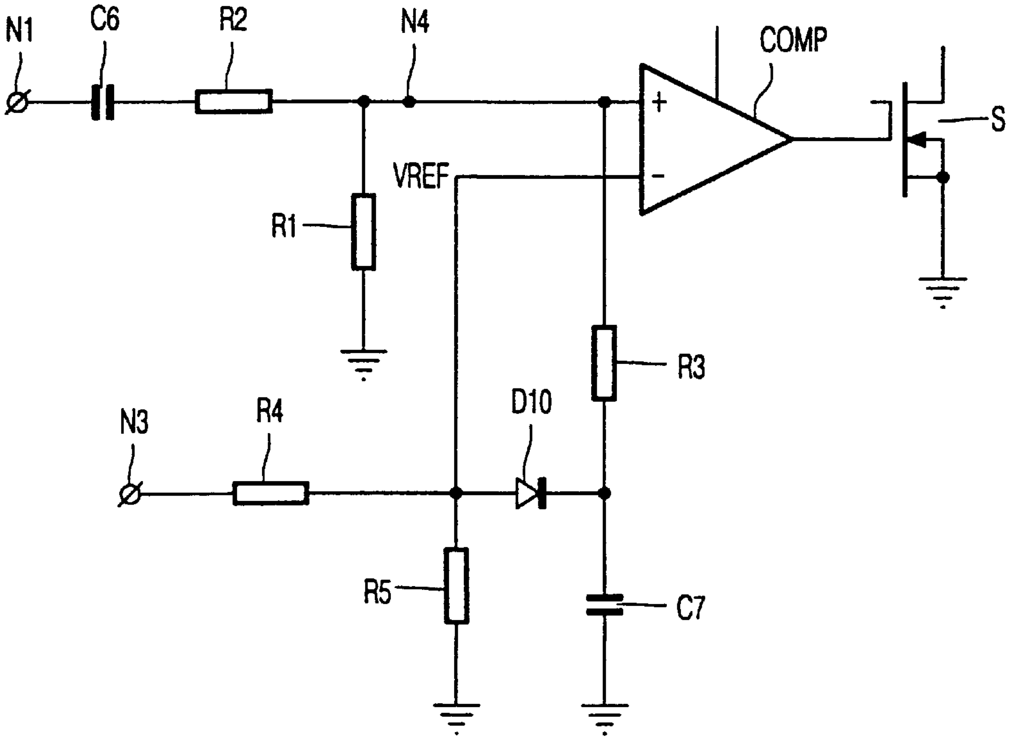

FIG. 4 shows a second embodiment of the second control circuit and the third switching element S. Sections of the circuit and components which correspond to sections of the circuit and components of the embodiment shown in FIG. 3 are denoted by the same symbols. In the embodiment shown in FIG. 4, the reference voltage is directly proportional to the voltage across capacitor C4. This reference voltage is generated by means of a first circuit section constituted by a series circuit of ohmic resistors R4 and R5 shunting capacitor C4. An output of the first circuit section is constituted by a common point of ohmic resistors R4 and R5 and is connected to the second input of comparator COMP. The second embodiment also comprises a second circuit section for generating a voltage Vrefmax which is equal to the highest value of the reference voltage Vref in each half cycle of the AC voltage which is present between input terminals K1 and K2. This second circuit section is constituted by the first circuit section, diode D10, capacitor C7 and ohmic resistor R3. A series circuit of diode D10 and capacitor C7 shunts the ohmic resistor R5. A common point of capacitor C7 and diode D10 is connected to the first input of comparator COMP via ohmic resistor R3. This first input is also connected to the output of a differentiator which is constructed in the same way as the differentiator in the embodiment shown in FIG. 3. Consequently, during operation of the embodiment, the first input of the comparator COMP conveys a signal which is equal to the sum of Vrefmax and the signal generated by the differentiator.

The voltage across capacitor C4 is modulated at a frequency which is equal to twice the frequency of the AC voltage which is present between input terminals K1 and K2. Embodiments of the second control circuit as shown in, for example, FIG. 3 suppress this modulation of the voltage across capacitor C4, which may lead to instabilities. Since the reference voltage Vref in the embodiment of FIG. 4 is directly proportional to the instantaneous value of the voltage across capacitor C4, the modulation of the voltage across capacitor C4 is suppressed to a smaller extent by this embodiment, so that the circuit arrangement has a stabler operation. Since the maximum value of the reference voltage is added in this embodiment to the voltage generated by the differentiator, it is achieved that the operation of the second control circuit is dependent on the amplitude of the AC voltage only to a relatively small extent.

A practical embodiment of a circuit arrangement as shown in FIG. 2, comprising a second control circuit as shown in FIG. 4, was dimensioned as follows. C4 had a capacitance of 10 $\mu$F. L1 had an inductance of 1 mH. The lamp fed by means of the circuit arrangement was a low-pressure mercury vapor discharge lamp having a nominal power of 58 W. R1=2.2 kΩR2=220kΩ, R4=220kΩ, R5=2.2kΩ. C6 and C7 had capacitances of 680 pF and 1 $\mu$f, respectively.

When the power consumption of the lamp was adjusted between 2 W and 50 W, the voltage across capacitor C4 assumed a value of between 345 and 405 V, at which a higher power consumption of the lamp corresponded to a lower voltage across capacitor C4. It was also found that the power factor was relatively high throughout this range of the power consumption of the lamp and the THD complied with the requirements stipulated in IEC 1000-3-2, class C.

What is claimed is:

1. A circuit arrangement for supplying a lamp (LA), comprising input terminals (K1, K2) for connection to the terminals of an AC voltage source, rectifying means (D1–D4) coupled to the input terminals and having output terminals (N3, N5) for rectifying an AC voltage supplied by the AC voltage source, a first branch interconnecting the output terminals of the rectifying means and comprising a series arrangement of a first unidirectional element (D8) and first capacitive means (C4), a second branch shunting the first capacitive means and comprising a series arrangement of a first switching element (Q1) and a second switching element (Q2), a first control circuit (SC1) for rendering the first and the second switching element conducting and non-conducting, a load circuit (L1, C2, K3, K4) having terminals (K3, K4) for accommodating a lamp (LA) and a first end of which is coupled to a common point N1 of the first and the second switching element, and a second end of which is coupled to one of the output terminals of the rectifying means, a third branch (C5) connecting a point N6 of the load circuit to a point N7 between one of the output terminals of the rectifying means and the first unidirectional element, a fourth branch shunting the first unidirectional element and comprising a third switching element (S), a second control circuit (SC2) for rendering the third switching element conducting and non-conducting, characterized in that the second control circuit comprises a differentiator (C6, R1, R2), an input of which is coupled to the point N1 and an output is coupled to a control electrode of the third switching element via a comparator (COMP), and the comparator is also coupled to a first circuit section (VrefG; R4, R5) for generating a reference voltage Vref.

2. A circuit arrangement as claimed in claim 1, wherein the first branch comprises a second unidirectional element (D7) and the point N7 is constituted by a common point of the first and the second unidirectional element.

3. A circuit arrangement as claimed in claim 2, wherein a fifth branch comprising a series arrangement of a third unidirectional element (D5) and a fourth unidirectional element (D6) shunting the series arrangement of the first unidirectional element and the second unidirectional element, wherein a common point N2 of the third and the fourth unidirectional element is connected to the second end (K4) of the load circuit, and wherein the fourth unidirectional element is shunted by second capacitive means (C1).

4. A circuit arrangement as claimed in claim 1, wherein the fourth branch comprises a fifth unidirectional element (D9).

5. A circuit arrangement as claimed in claim 1, wherein the differentiator comprises a series arrangement of third capacitive means (C6) and two ohmic resistors (R1, R2).

6. A circuit arrangement as claimed in claim 1, wherein the first circuit section comprises means (R4, R5) for rendering the reference voltage directly proportional to the voltage across the first capacitive means.

7. A circuit arrangement as claimed in claim 6, comprising a second circuit section (R3, R4, R5, C7, D10) for generating a voltage Vrefmax which is equal to the highest value of the reference voltage Vref in each half cycle of the AC voltage, and for adding Vrefmax to the voltage at the output of the differentiator.

* * * * *